United States Patent
Takahashi et al.

(10) Patent No.: US 10,281,565 B2
(45) Date of Patent: May 7, 2019

(54) DISTANCE MEASURING DEVICE AND SOLID-STATE IMAGE SENSOR USED THEREIN

(71) Applicant: Panasonic Intellectual Property Management Co., Ltd., Osaka (JP)

(72) Inventors: Syoma Takahashi, Kyoto (JP); Haruka Takano, Osaka (JP); Tomohiko Kanemitsu, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 371 days.

(21) Appl. No.: 15/358,230

(22) Filed: Nov. 22, 2016

(65) Prior Publication Data

US 2017/0074976 A1     Mar. 16, 2017

Related U.S. Application Data

(63) Continuation of application No. PCT/JP2015/000384, filed on Jan. 29, 2015.

(30) Foreign Application Priority Data

Jun. 9, 2014 (JP) ................. 2014-119128

(51) Int. Cl.
G01C 3/08 (2006.01)
G01S 7/486 (2006.01)
(Continued)

(52) U.S. Cl.
CPC ............. *G01S 7/4865* (2013.01); *G01C 3/06* (2013.01); *G01C 3/085* (2013.01); *G01S 7/4876* (2013.01); *G01S 17/10* (2013.01); *G01S 17/89* (2013.01)

(58) Field of Classification Search
CPC ...... G01S 7/4865; G01S 7/4876; G01S 17/10; G01S 17/89; G01C 3/06; G01C 3/085
See application file for complete search history.

(56) References Cited

U.S. PATENT DOCUMENTS

| | | | | |
|---|---|---|---|---|
| 8,311,286 B2* | 11/2012 | Masuda | ................. | G01S 7/491 |
| | | | | 382/106 |
| 2008/0205708 A1* | 8/2008 | Masuda | ................. | G01S 7/491 |
| | | | | 382/106 |

(Continued)

FOREIGN PATENT DOCUMENTS

| | | |
|---|---|---|
| JP | 2013-175951 A | 9/2013 |
| JP | 2013-235390 | 11/2013 |

OTHER PUBLICATIONS

International Search Report of PCT application No. PCT/JP2015/000384 dated Mar. 24, 2015.

*Primary Examiner* — Samantha K Abraham
(74) *Attorney, Agent, or Firm* — McDermott Will & Emery LLP

(57) ABSTRACT

A distance measuring device using a TOF (Time of Flight) scheme includes a controller, a light receiver, and a calculator. The controller generates a first exposure signal, a second exposure signal, a third exposure signal, and one particular exposure signal selected from the first, the second, and the third exposure signals. The light receiver performs a first exposing process, a second exposing process, a third exposing process, and a particular exposing process corresponding to the particular exposure signal out of the first, the second, and the third exposing processes. The calculator determines, based on a difference between an exposure amount obtained from the particular exposing process and an exposure amount obtained from an exposing process according to one of the first, second, and the third exposure signals corresponding to the particular exposure signal, (Continued)

whether or not the light emitted from the distance measuring device interferes with light emitted from other distance measuring device.

11 Claims, 13 Drawing Sheets

(51) Int. Cl.
*G01C 3/06* (2006.01)
*G01S 17/10* (2006.01)
*G01S 17/89* (2006.01)
*G01S 7/487* (2006.01)

(56) References Cited

U.S. PATENT DOCUMENTS

| | | | | |
|---|---|---|---|---|
| 2008/0205709 A1* | 8/2008 | Masuda | ............... | G01S 7/491 |
| | | | | 382/106 |
| 2008/0231831 A1* | 9/2008 | Masuda | ............... | G01S 7/493 |
| | | | | 356/5.1 |
| 2009/0079959 A1* | 3/2009 | Masuda | ............... | G01S 7/493 |
| | | | | 356/5.1 |

* cited by examiner

DISTANCE MEASURING DEVICE AND SOLID-STATE IMAGE SENSOR USED THEREIN

RELATED APPLICATIONS

This application is a Continuation of International Application No. PCT/JP2015/000384, filed on Jan. 29, 2015, which in turn claims priority from Japanese Patent Application No. 2014-119128, filed on Jun. 9, 2014, the contents of all of which are incorporated herein by reference in their entireties.

BACKGROUND

1. Technical Field

The present disclosure relates to a distance measuring device.

2. Description of the Related Art

There exists a scheme which enables three-dimensional measurement utilizing distance dependence of time of flight (TOF) of a light pulse, which time of flight is from transmission of a light pulse to reception of the light pulse reflected and returning from an object. In measuring a distance according to this scheme (hereinafter referred to as the TOF scheme), presence of other TOF distance measuring system within the measurement range causes interference of projected light pulses, which results in an error in the measured distance, impairing the measurement precision.

Unexamined Japanese Patent Publication No. 2013-235390 discloses a scheme for dynamically detecting such interference, with a system that determines, in the state where a distance measuring sensor that interferes is previously known, an occurrence of interference based on whether a pulse arrives from other TOF distance measuring system within a specified interference detection time period. Thus, the system can detect and avoid interference.

SUMMARY

A distance measuring device according to one exemplary embodiment of the present disclosure is a distance measuring device using a TOF (Time of Flight) scheme. The distance measuring device includes a light source, a controller, a light receiver, and a calculator. The light source emits light in accordance with a light emission signal. The controller generates the light emission signal instructing emission of light to a target object, a first exposure signal instructing exposure of reflected light from the target object in synchronization with the light emission signal, a second exposure signal instructing exposure of the reflected light from the target object in synchronization with the light emission signal and at timing different from the first exposure signal, and a third exposure signal instructing exposure of background light in a period during which the reflected light does not exist. The light receiver performs a first exposing process according to the first exposure signal, a second exposing process according to the second exposure signal, and a third exposing process according to the third exposure signal. The calculator obtains a distance to the target object based on the TOF scheme by calculating a first exposure amount in the first exposing process, a second exposure amount in the second exposing process, and a third exposure amount according to the third exposing process, and using the first exposure amount, the second exposure amount, and the third exposure amount. The controller generates, in every predetermined period, the first exposure signal, the second exposure signal, the third exposure signal, and one particular exposure signal selected from the first exposure signal, the second exposure signal, and the third exposure signal. The light receiver performs, in the predetermined period, the first exposing process, the second exposing process, the third exposing process, and a particular exposing process corresponding to the particular exposure signal out of the first exposing process, the second exposing process, and the third exposing process. The calculator determines, based on a difference between an exposure amount obtained from the particular exposing process and an exposure amount obtained from an exposing process according to one of the first exposure signal, the second exposure signal, and the third exposure signal corresponding to the particular exposure signal, whether or not the light emitted from the distance measuring device and light emitted from other distance measuring device interfere with each other.

Accordingly, the distance measuring device using the TOF scheme can dynamically detect interference from an unidentified unknown TOF distance measuring system.

Here, the particular exposure signal may be the first exposure signal and the particular exposing process may be the first exposing process.

Here, the particular exposure signal may be the second exposure signal and the particular exposing process may be the second exposing process.

Here, the particular exposure signal may be the third exposure signal, and the particular exposing process may be the third exposing process.

Here, the light emission signal may have a plurality of pulses, and generation timing of the plurality of pulses in the particular exposing process may be at irregular intervals and different from generation timing of the plurality of pulses in the exposing process according to one of the first exposure signal, the second exposure signal, and the third exposure signal corresponding to the particular exposure signal.

Accordingly, when there exists interference, the difference between the first-time exposure amount and the second-time exposure amount with the particular exposure signal is enhanced, whereby interference detection is facilitated.

Here, when the exposure amount obtained from the exposing process according to one of the first exposure signal, the second exposure signal, and the third exposure signal corresponding to the particular exposure signal is equal to or greater than a first threshold value and equal to or smaller than a second threshold value, the calculator may compare the exposure amount obtained from the particular exposing process with the exposure amount obtained from the exposing process according to one of the first exposure signal, the second exposure signal, and the third exposure signal corresponding to the particular exposure signal.

Accordingly, an excessively small exposure amount and an excessively great exposure amount are excluded from the comparison target, thereby avoiding the influence of shot noise.

Here, the light receiver may be a solid-state image sensor having a plurality of pixels arranged in two-dimensional manner, and the calculator may calculate the difference by comparing, on a corresponding pixel-by-pixel basis, the exposure amount obtained from the particular exposing process with the exposure amount obtained from the exposing process according to one of the first exposure signal, the second exposure signal, and the third exposure signal corresponding to the particular exposure signal.

Accordingly, possibility of interference can be determined for each of the pixels.

Here, the calculator may calculate, for each of the pixels, the difference between the exposure amount obtained from the particular exposing process and the exposure amount obtained from the exposing process according to one of the first exposure signal, the second exposure signal, and the third exposure signal corresponding to the particular exposure signal. The calculator may calculate a count value by counting the number of the pixels determined to have the calculated difference greater than a predetermined value. When the count value is greater than a predetermined number, the calculator may set an interference signal to valid, the interference signal indicating that the light emitted from the distance measuring device and the light emitted from other distance measuring device interfere with each other.

Accordingly, it is determined that interference exists when the number of the pixels with possible interference is greater than a predetermined number. Thus, determination precision can be improved.

Here, the calculator may set the interference signal to valid when a successive number of the pixels determined to have the difference greater than the predetermined value is greater than the predetermined number.

Accordingly, it is determined that interference exists when the number of the pixels with possible interference is greater than the predetermined number and successive. Thus, determination precision can be improved.

Here, the calculator may determine the predetermined number by a random number.

Accordingly, in the case where other distance measuring device of the same type operates nearby also, interference can be easily detected.

The distance measuring device of the present disclosure provides a distance measuring device using TOF scheme capable of dynamically detecting interference from an unidentified unknown TOF distance measuring system.

DETAILED DESCRIPTION OF EMBODIMENT

Firstly, a description will be given of the problem associated with the conventional technique.

According to the conventional technique disclosed in Unexamined Japanese Patent Publication No. 2013-235390, interference is detected outside a distance measuring period based on whether a projected light pulse from other pulse TOF distance measuring system exists. Before a projected light pulse from other TOF distance measuring system interferes in the distance measuring period, timing of a projected light pulse of a predetermined system is changed, so as to avoid the influence of interference.

However, Unexamined Japanese Patent Publication No. 2013-235390 supports only systems that are previously identified and numbered, and having their start timing synchronized. Therefore, the technique has a problem that it cannot support a system not being synchronized.

The present disclosure provides a distance measuring device that dynamically detects interference from an unidentified unknown TOF distance measuring system.

In the following, with reference to the drawings, a description will be given of a distance measuring device (a distance measuring and imaging device) according to exemplary embodiments of the present disclosure. Note that, the following exemplary embodiments are all just specific examples of the present disclosure. Numerical values, shapes, materials, constituents, disposed positions and connection manner of constituents, steps, the order of steps and the like are examples and not intended to limit the present disclosure. Further, the processes performed by a controller or a calculator described in the following exemplary embodiments may be performed by a CPU (Central Processing Unit) formed by an integrated circuit and a semiconductor memory storing a program for executing the processes.

First Exemplary Embodiment

Figure 1:
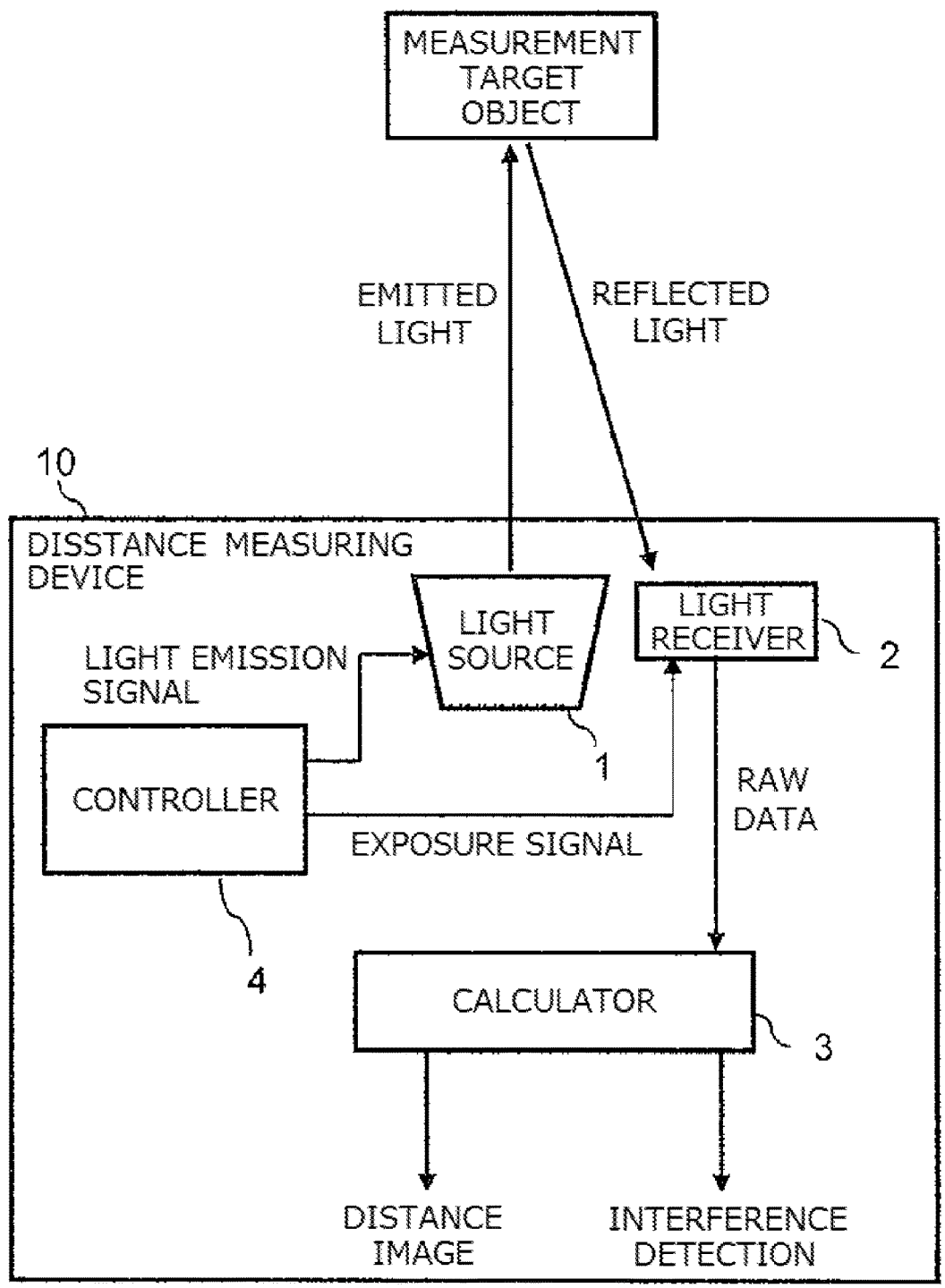
FIG. 1 is a block diagram showing an exemplary configuration of a distance measuring device according to first exemplary embodiment.

FIG. 1 is a block diagram showing an exemplary configuration of a distance measuring device (a distance measuring and imaging device) according to first exemplary embodiment.

Distance measuring device 10 is configured by light source 1, light receiver (solid-state image sensor) 2, calculator (TOF calculator) 3, and controller 4.

Firstly, a description will be briefly given of the basic TOF operation principle of distance measuring device 10 according to the present exemplary embodiment.

Figure 2:
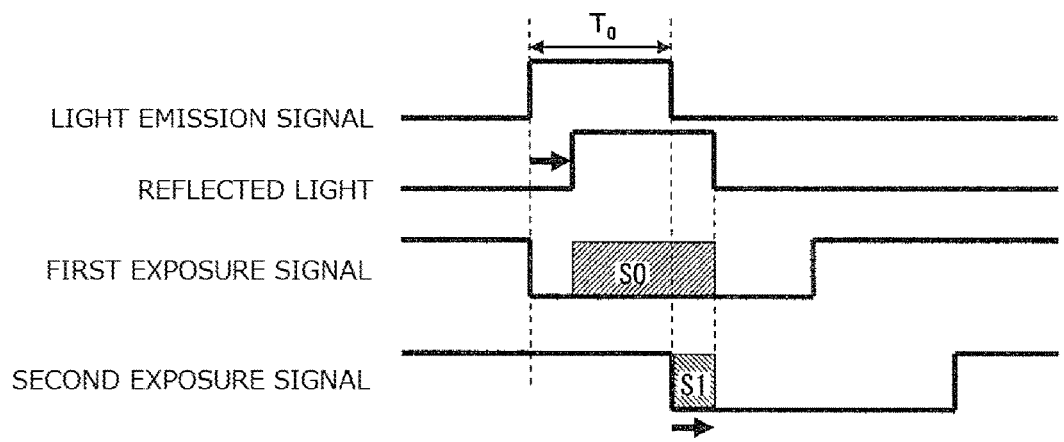
FIG. 2 is a timing chart showing a light emission signal and exposure signals in a pulse TOF scheme.

FIG. 2 is a timing chart showing a light emission signal and exposure signals in the TOF scheme. In FIG. 2, for the sake of convenience, what are shown in parallel are two patterns which originally differ from each other in timing, namely, the pattern in which exposure is performed with a first exposure signal (which is referred to as first exposure) and the pattern in which exposure is performed with a second exposure signal (which is referred to as second exposure). In the TOF scheme (what is called a pulse TOF scheme), in measuring a distance to a measurement target object, to a pulse of a light emission signal, the reflected light from the measurement target object is exposed in two patterns of the first exposure signal and the second exposure signal which differ from each other in timing. Based on the ratio between their respective light amounts, the distance to the measurement target object is calculated.

In FIG. 2, with a pulse of the first exposure signal, the first exposure is performed so as to include the entire reflected light from the measurement target object. Further, with a pulse of the second exposure signal, the second exposure is performed in such a manner that the exposure amount increases as the reflected light from the measurement target object delays relative to the light emission timing. Further, in order to detect offset components such as background light, the light emission signal is stopped and third exposure is performed under the condition identical to that of the first and second exposure signals.

Here, distance L to the measurement target object is represented by Equation (1), where: S0 is an exposure amount by the first exposure; S1 is an exposure amount by the second exposure; BG is an exposure amount of background light by the third exposure; T0 is a pulse width of direct light being emitted; and c is the speed of light (299, 792, 458 m/s).

$$L = \frac{c \times T_0}{2} \times \left\{ \frac{S1 - BG}{S0 - BG} \right\} \quad (1)$$

Next, with reference to FIG. 3, a description will be given of the phase difference TOF scheme according to the present exemplary embodiment.

Figure 3:
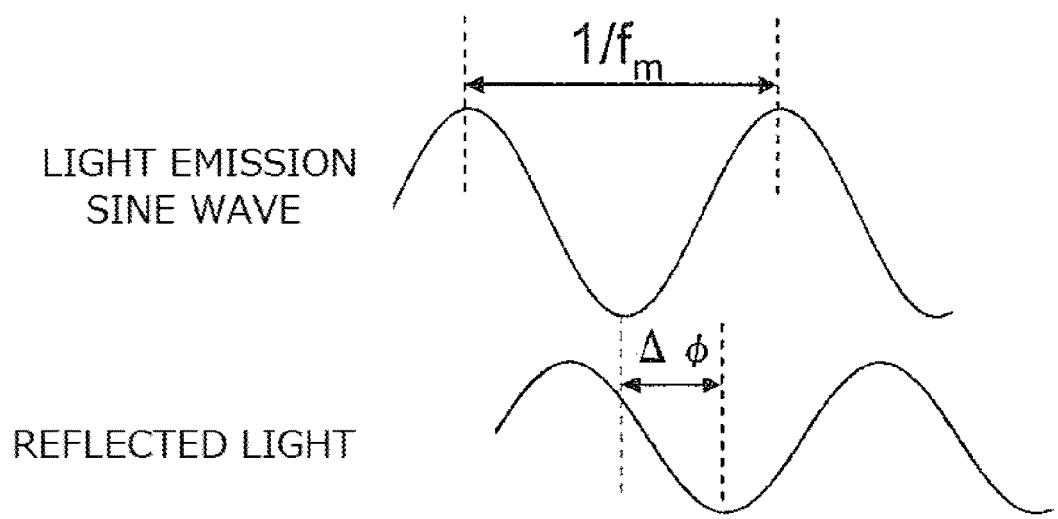
FIG. 3 is a diagram showing a light emission sine wave of a light source and reflected light arriving at a light receiver.

FIG. 3 is a diagram showing a light emission sine wave of light source 1 and reflected light arriving at light receiver 2. In the phase difference TOF scheme, distance L to the measurement target object is calculated using Equation (2), where Δφ is a phase difference between the light emission sine wave and the reflected light returning from an object, and fm is the frequency of the sine wave. That is, the cycle of the sine wave is 1/fm.

$$L = \frac{c}{2 \times f_m} \times \left\{ \frac{\Delta \phi}{2\pi} \right\} \quad (2)$$

Next, in order to facilitate understanding of the present disclosure, a description will be given of the relationship between the pulse TOF operation and interference and between the phase difference TOF operation and interference, that is, the principle on which a measurement error occurs.

Figure 4:
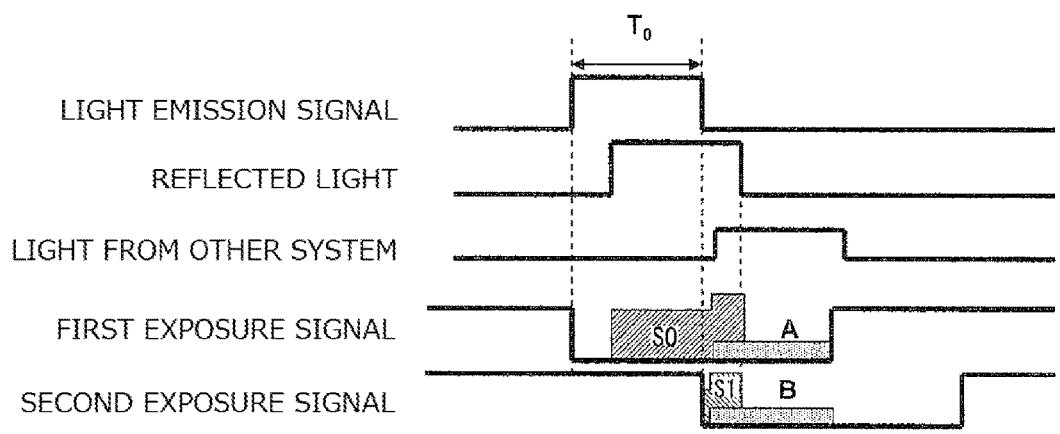
FIG. 4 is a timing chart in which light projected from other distance measuring system is mixed with the light emission signal and the exposure signals in the timing chart of FIG. 2.

FIG. 4 is a timing chart in which light projected from other distance measuring system is mixed with the light emission signal and the exposure signals of the timing chart of FIG. 2.

In FIGS. 4, A and B are the exposure amounts mixed from other distance measuring system at light receiver 2. In the pulse TOF operation, as shown in FIG. 4, when there exists projected light from other TOF distance measuring system in a measurement range, IR (InfraRed) components from other TOF distance measuring system interfere with a light reception signal (e.g., an IR signal), which disadvantageously invites an error in the measured distance. Equation (3) is an equation for obtaining a distance in such a case. Exposure amounts A, B mixed from other source are added irrespective of the ratio between the exposure amounts S0, S1 to be measured. Consequently, the measured distance contains an error.

$$L = \frac{c \times T_0}{2} \times \left\{ \frac{(S1 + A) - BG}{(S0 + B) - BG} \right\} \quad (3)$$

Figure 5:
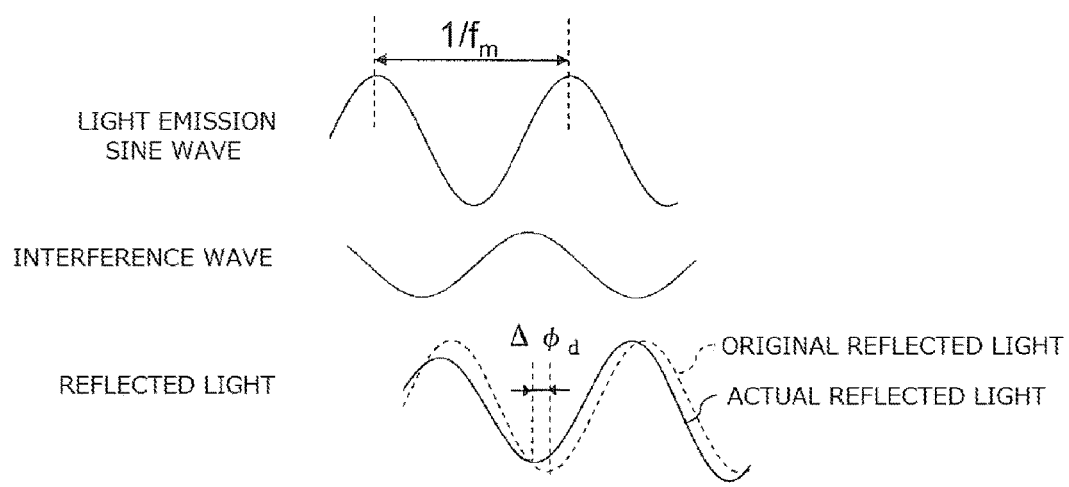
FIG. 5 is a timing chart in which light projected from other distance measuring system is mixed with the light emission sine wave and the reflected light in FIG. 3 showing a phase difference TOF operation.

Further, FIG. 5 is a timing chart in which light projected from other distance measuring system is mixed with the light emission sine wave and the reflected light in FIG. 3 showing a phase difference TOF operation. In the phase difference TOF operation, as shown in FIG. 5, when there exists an interference wave from other phase difference TOF distance measuring system, the reflected light (the sine wave represented by a solid line in the drawing) becomes the combined wave, and phase shift Δφd occurs relative to the original phase (the sine wave represented by a broken line in the drawing). The equation for obtaining a distance also disadvantageously contains an error as Equation (4).

$$L = \frac{c}{2 \times f_m} \times \left\{ \frac{(\Delta \phi + \Delta \phi_d)}{2\pi} \right\} \quad (4)$$

From the foregoing, in measuring a distance by the TOF scheme, interference from other TOF distance measuring system poses a great problem of inviting an error in distance calculation.

Accordingly, in order to solve the problem, the present disclosure provides a distance measuring device that dynamically detects interference from an unidentified unknown TOF distance measuring system.

In the following, with reference to FIGS. 1 and 6, a detailed description will be given of the distance measuring device according to the first exemplary embodiment.

Figure 6:
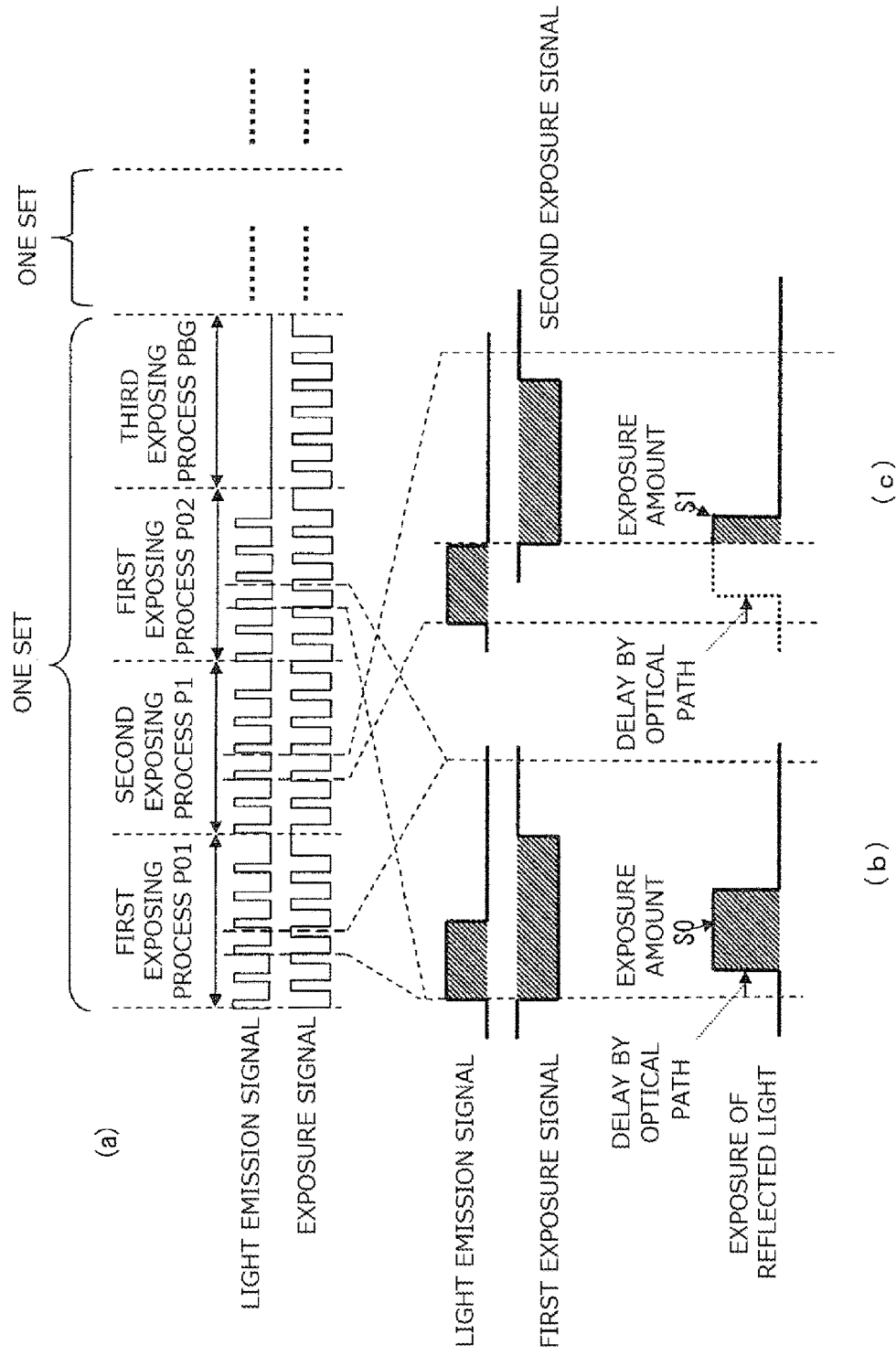
FIG. 6 is a timing chart showing timing of various exposing processes performed in the distance measuring device shown in FIG. 1.

FIG. 6 is a timing chart showing timing of various exposing processes performed in the distance measuring device shown in FIG. 1.

In FIG. 1, light source 1 emits light according to a light emission signal from controller 4.

Controller 4 generates a light emission signal instructing emission of light to a target object, and first to third exposure signals.

The first exposure signal instructs exposure of reflected light from the target object in synchronization with the light emission signal. For example, as shown in FIG. 2 and section (b) in FIG. 6, the pulse of the first exposure signal becomes active simultaneously with the pulse of the light emission signal becoming active, and becomes inactive after a lapse of a certain time since when the pulse of the light emission signal becomes inactive. That is, the pulse of the first exposure signal becomes active simultaneously with the light emission signal, and the pulse width thereof is longer than that of the light emission signal. Thus, the reflected light from the target object can be entirely exposed.

The second exposure signal instructs exposure of reflected light from the target object in synchronization with the light emission signal and at timing different from the first exposure signal. For example, as shown in FIG. 2 and section (c) in FIG. 6, the second exposure signal becomes active simultaneously with the pulse of the light emission signal becoming inactive, and becomes inactive after a lapse of a certain time. Thus, the pulse of the second exposure signal is set such that the exposure amount increases as the reflected light from the target object delays relative to the light emission timing.

The third exposure signal instructs exposure of background light in a period where no reflected light exists.

Light receiver 2 is, for example, a solid-state image sensor having a plurality of pixels which are two-dimensionally arranged. Light receiver 2 performs first exposing process P0 according to the first exposure signal, second exposing process P1 according to the second exposure signal, and third exposing process PBG according to the third exposure signal.

Calculator 3 calculates first exposure amount S0, second exposure amount S1, and third exposure amount BG in first exposing process P0, second exposing process P1, and third exposing process PBG, respectively, and obtains the distance to the target object by the TOF scheme using first exposure amount S0, second exposure amount S1, and third exposure amount BG. In the example shown in FIG. 6, first exposure amount S0, second exposure amount S1, and third exposure amount BG are each a value accumulated with exposure signals issued for a plurality of times. Further, in a predetermined period in FIG. 6 (in one set period in FIG. 6), first exposing process P0 is performed twice under the identical condition and at different timing. That is, in FIG. 6, first exposing process P0 is performed twice, namely, first-time first exposing process P01 and second-time first exposing process P02.

Controller 4 generates, in a predetermined period, the first exposure signal to the third exposure signal, and again generates a particular exposure signal which is one of the first exposure signal to the third exposure signal. FIG. 6 shows an example where the particular exposure signal is the first exposure signal.

Light receiver 2 performs, in a predetermined period, the first exposing process to the third exposing process, and again performs a particular exposing process that corresponds to the particular exposure signal, out of the first exposing process to the third exposing process. FIG. 6 shows an example where the particular exposing process is the first exposing process.

Calculator 3 determines, based on the difference between the exposure amount obtained from the first-time particular exposing process and the exposure amount obtained from the second-time particular exposing process in the predetermined period, whether or not interference between light emission by other distance measuring device and light emission by the present distance measuring device occurs.

In more detail, controller 4 outputs the light emission signal and the exposure signals (which are referred to as the first to third exposure signals corresponding to the exposing processes, for the sake of convenience) as shown in FIG. 2 and section (b) in FIG. 6. Light source 1 emits light when the light emission signal is H (High). In the present exemplary embodiment, as shown in section (a) in FIG. 6, the first exposing process is performed twice in a predetermined period (one set period). That is, control is exerted so that four signals, namely, exposure amount S01, exposure amount S1, exposure amount S02, and exposure amount BG are acquired by performing first exposing process P01, second exposing process P1, first exposing process P02, and third exposing process PBG, respectively, in one set period.

Note that, in section (a) in FIG. 6, though light emission and exposure are performed for a plurality of times in each of first exposing process P01, second exposing process P1, and first exposing process P02, light emission and exposure may be performed at least once. Though light emission and exposure are performed for a plurality of times also in third exposing process PBG, light emission and exposure may be performed at least once. Further, exposure amount S01, exposure amount S1, exposure amount S02, and exposure amount BG in the case where exposure is performed for a plurality of times in each of the exposing processes may each be a value accumulated in the exposure performed for a plurality of times.

Further, light receiver 2 performs exposure of reflected light being light reflected from the target object just in a period during which an exposure signal is L (Low), and outputs the sum of the exposure amounts of L period. Light receiver 2 is, for example, a solid-state image sensor (an area sensor) having a plurality of pixels which are two-dimensionally arranged. Light receiver 2 photoelectrically convers reflected light, and converts about 20000 electron per pixel at the maximum to 0 to 4095 by 12-bit AD (Analog-Digital) conversion, and outputs the result as RAW data. TOF calculator 3 calculates the distance of each pixel using the RAW data and from Equation (5), and outputs a distance image and an interference detection signal.

$$L = \frac{c \times T_0}{2} \times \left\{ \frac{(S1 - BG)}{((S01 + S02)/2) - BG} \right\} \quad (5)$$

Next, with reference to FIG. 7, a description will be given of an exemplary operation of detecting interference after the exposing processes of one set has completed.

Figure 7:
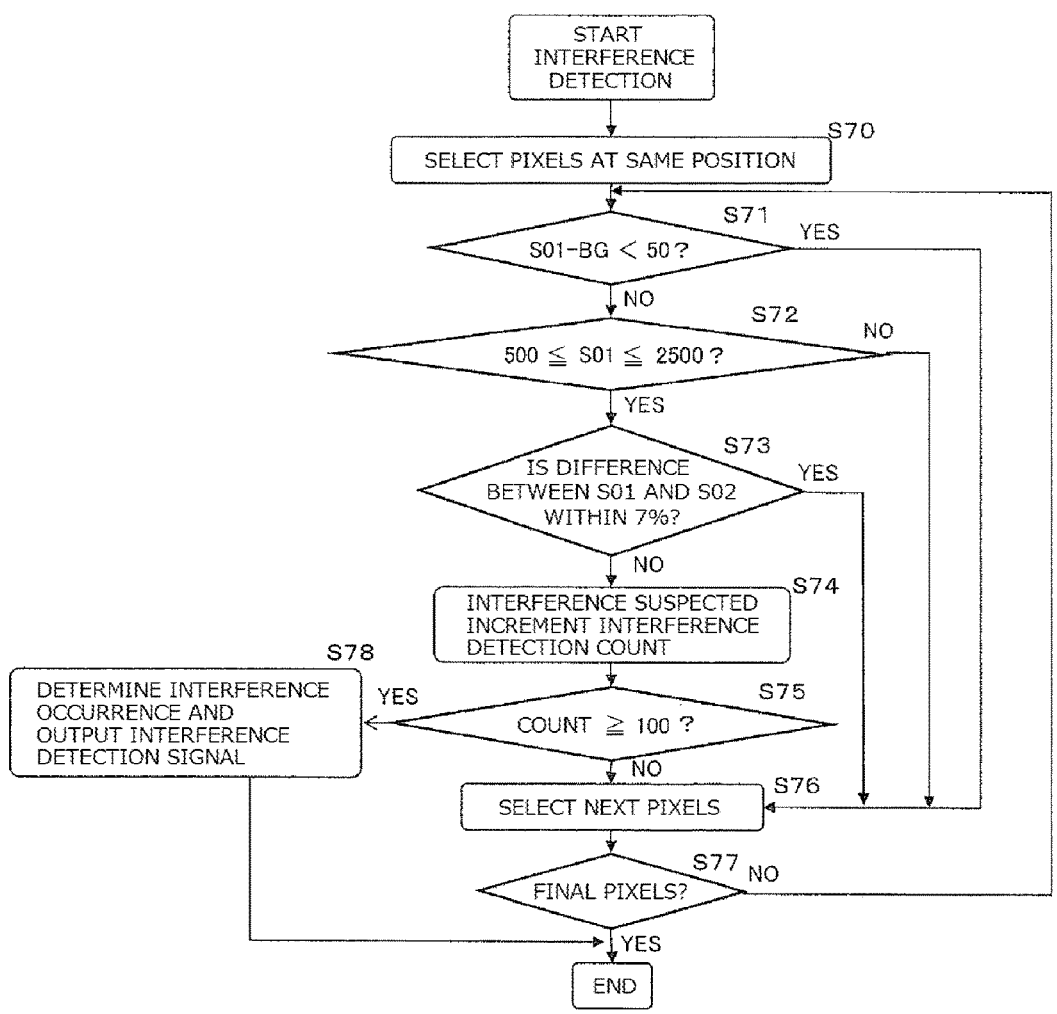
FIG. 7 is a flowchart showing an exemplary operation of detecting interference.

FIG. 7 is a flowchart showing an exemplary operation of detecting interference. Calculator 3 receives RAW data from light receiver 2 in a predetermined period (one set period), thereby stores captured images respectively obtained by first exposing process P01, second exposing process P1, first exposing process P02, and third exposing process PBG. The captured image obtained from first exposing process P01 represents exposure amount S01 per pixel. Similarly, the captured image obtained from second exposing process P1 represents exposure amount S1 per pixel. The captured image obtained from first exposing process P02 represents exposure amount S02 per pixel. The captured image obtained from third exposing process PBG represents exposure amount BG per pixel. These captured images are updated every predetermined period. Calculator 3 stores four captured images obtained from the first previous set, and performs the processes shown in FIG. 7 on the four captured images.

Calculator 3 selects four corresponding pixels (that is, located at the same position) respectively from the four captured images (S70). Note that, the pixel representing exposure amount S1 may not be selected because it is not used in the interference detecting operation. It is determined whether the difference between exposure amount S01 and exposure amount BG in the selected four pixels is smaller than a certain value (S71). (Exposure amount S01—exposure amount BG) being smaller than a certain value (in the present exemplary embodiment, 50) means that there exists substantially no reflection signal, that is, the comparison is made between points at infinity, and the comparison of the pixels is meaningless. Therefore, next four corresponding pixels are selected (S76). Note that, while the certain value is 50 out of 4096 tones and about 1.2% relative to the maximum tone, it may be a few percent.

Further, comparison with pixels whose exposure amount is excessively small or great is influenced by jig noise or shot noise. Accordingly, whether or not exposure amount S01 falls within a specified range (in the present exemplary embodiment, a range from first threshold value 500 to second threshold value 2500, both inclusive) is determined (S72), and next four corresponding pixels are selected when exposure amount S01 is outside the specified range. Here, the first threshold value and the second threshold value may be respectively about 10% and about 60% relative to the maximum tone. Further, jig noise refers to noise when an exposure amount is a small signal. Since the original signal amount is small, relatively, the noise is largely attributed to hardware.

When exposure amount S01 falls within the specified range, exposure amount S01 in the captured image obtained from first exposing process P01 and exposure amount S02 in the captured image obtained from second-time first exposing process P02 are compared with each other. Taking into consideration of the influence of shot noise, it is determined that there exists no interference when the difference falls within 7%, and interference is suspected to exist when the difference is greater than 7% (S73). When existence of interference is suspected, the interference detection count is incremented (S74). When the value becomes equal to or greater than a predetermined number (e.g., 100) (S75: YES), occurrence of interference is determined in this set (also referred to as a frame), and an interference detection signal is set to H (valid) (S78).

Further, after calculator 3 has performed the above-described processes on the final pixels, the operation of detecting interference ends (S77).

Next, the operation of detecting interference will be detailed.

Figure 8:
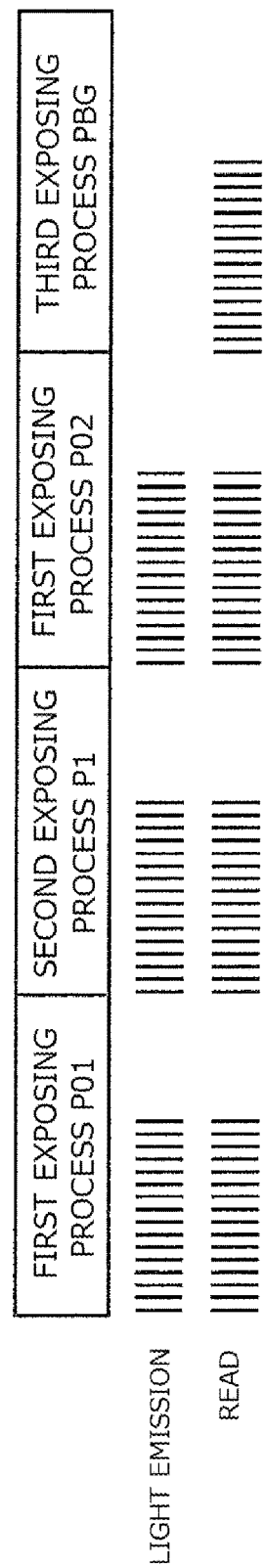
FIG. 8 is a diagram showing one set of exposing processes that includes acquiring exposure amount S0 twice according to the exemplary embodiment.

FIG. 8 shows exposing processes of one set that includes acquiring exposure amount S0 twice according to the present exemplary embodiment. First exposing process P01 for acquiring exposure amount S01 and second-time first exposing process P02 for acquiring exposure amount S02 are identical to each other in the timing condition. Accordingly, when there exists no interference, exposure amounts S01, S02 represented by the corresponding pixels become substantially the same outputs.

Figure 9:
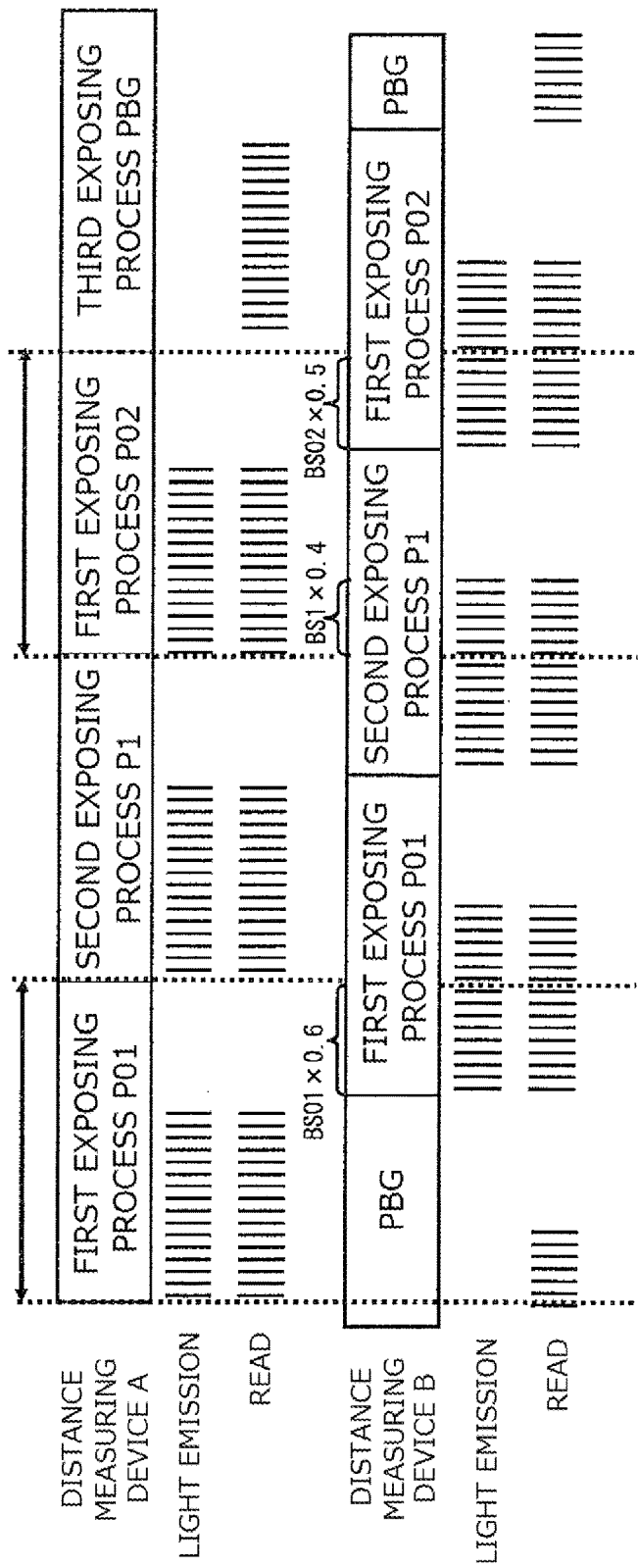
FIG. 9 is a diagram showing one set of exposing processes where interference from other source exists.

In contrast, FIG. 9 shows exposing processes of one set in the case where interference from other source exists. As shown in FIG. 9, it is assumed that distance measuring device A and distance measuring device B are in operation at the same time. Note that, while the manner of interference depends on the circumstances, in the case shown in the drawing, 60% of reflected light in first exposing process P01 of distance measuring device B influences first exposing process P01 of distance measuring device A. Further, 40% of reflected light in second exposing process P1 and 50% of reflected light in second-time first exposing process P02 of distance measuring device B influence second-time first exposing process P02 of distance measuring device A. In this case, exposure amount S01 in first exposing process P01 and exposure amount S02 in second-time first exposing process P02 in distance measuring device A are represented as follows, for example.

$S01 = AS01 + BS01 \times 0.6$ $S02 = AS02 + BS1 \times 0.4 + BS02 \times 0.5$

Where AS01 is the exposure amount by light emission of distance measuring device A in first exposing process P01 of distance measuring device A. AS02 is exposure amount by light emission of distance measuring device A in second-time first exposing process P02 of distance measuring device A. BS01 is exposure amount in distance measuring device A by light emission of distance measuring device B in first exposing process P01. BS1 is exposure amount in distance measuring device A by light emission of distance measuring device B in second exposing process P1. BS02 is the exposure amount in distance measuring device A by light emission of distance measuring device B in first exposing process P02.

As shown in the above equations, when there exists interference from other distance measuring device, a difference occurs between exposure amount S01 by first exposing process P01 and exposure amount S02 by second-time first exposing process P02 which are measured under the same condition. Accordingly, as shown in the interference detecting operation in FIG. 7, whether interference exists can be detected by detecting the difference between exposure amount S01 and exposure amount S02. Note that, the exposure amount acquired for a plurality of times in one set period is not limited to exposure amount S0 in the first exposing process (S01 or S02), and may be exposure amount S1 or exposure amount BG.

Figure 10:
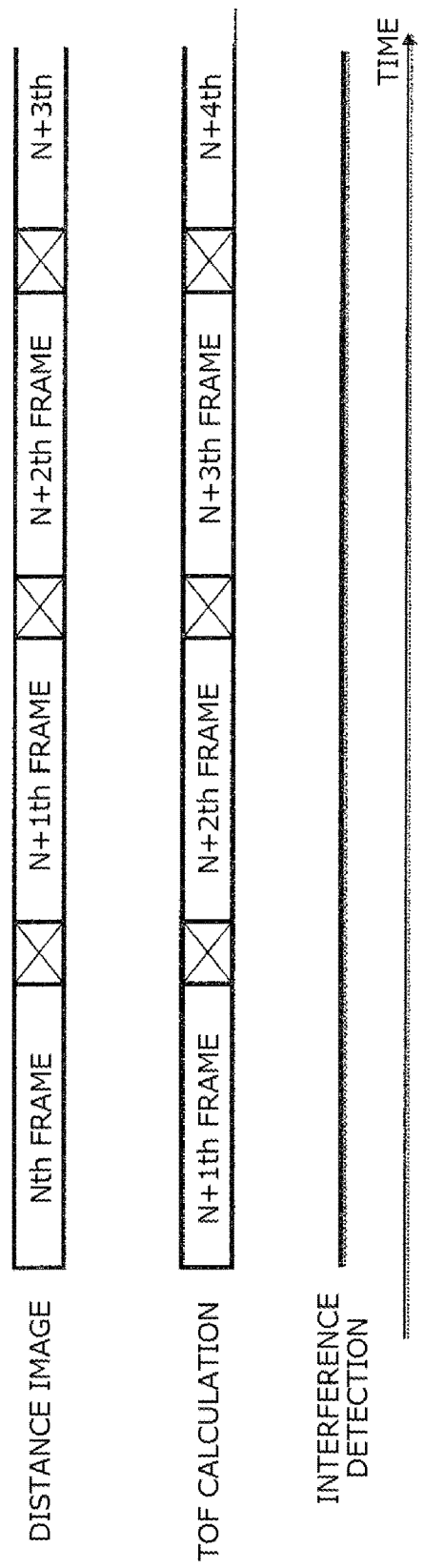
FIG. 10 is a diagram schematically showing timing of a TOF calculation, a distance image, and an interference detection signal when there exists no interference.
Figure 11:
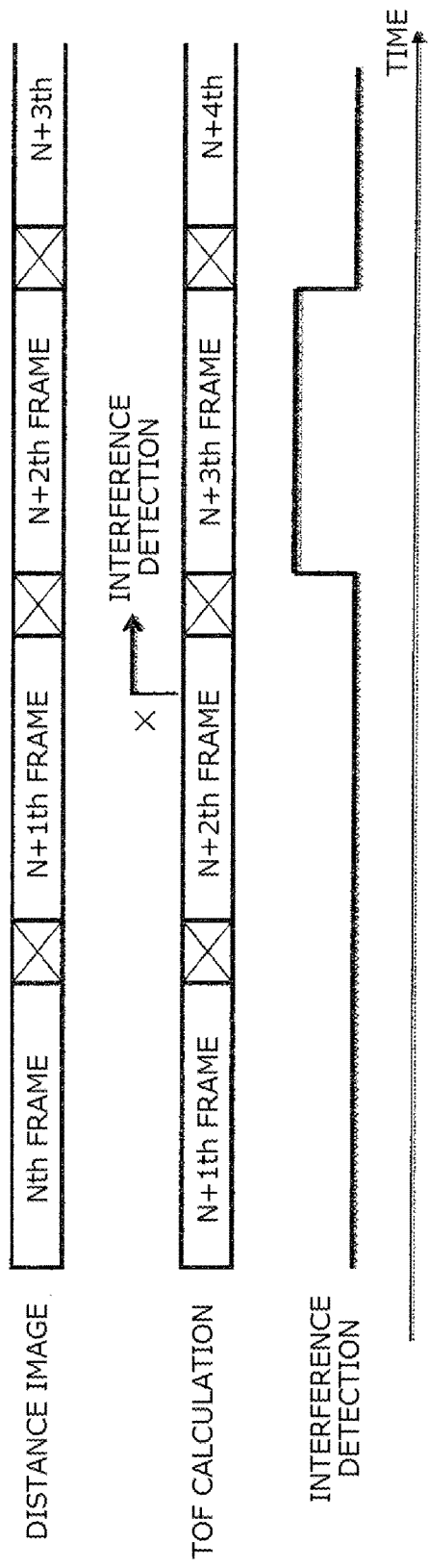
FIG. 11 is a diagram schematically showing timing of a TOF calculation, a distance image, and an interference detection signal when there exists interference.

Next, a description will be given of timing of a TOF calculation, a distance image, and an interference detection. FIG. 10 is a diagram schematically showing timing of a TOF calculation, a distance image, and an interference detection signal when there exists no interference. FIG. 11 is a diagram schematically showing timing of a TOF calculation, a distance image, and an interference detection signal when there exists interference. Each frame in FIGS. 10 and 11 corresponds to one set period in FIG. 6.

In FIG. 10, in the state where there exists no interference, a TOF calculation of the N+1th frame is calculated while a distance image of the Nth frame is displayed, and a distance image is output after a 1 frame delay. In FIG. 11, in the case where interference occurs in the N+2th frame and during a period in which the frame suspected of interference is displayed, the interference detection signal is set to H (that is, valid), so as to inform the occurrence of interference.

As described above, the first exemplary embodiment can dynamically detect any interference in the case where a plurality of distance measuring devices of the TOF scheme exist.

Further, in the present exemplary embodiment, exposure amount S0 whose signal amount is greatest and influenced by shot noise is acquired as exposure amount S01 and exposure amount S02, and the average thereof ((S01+S02)/2) is used as exposure amount S0. Thus, variations are cut in half while interference detection is performed.

Figure 12:
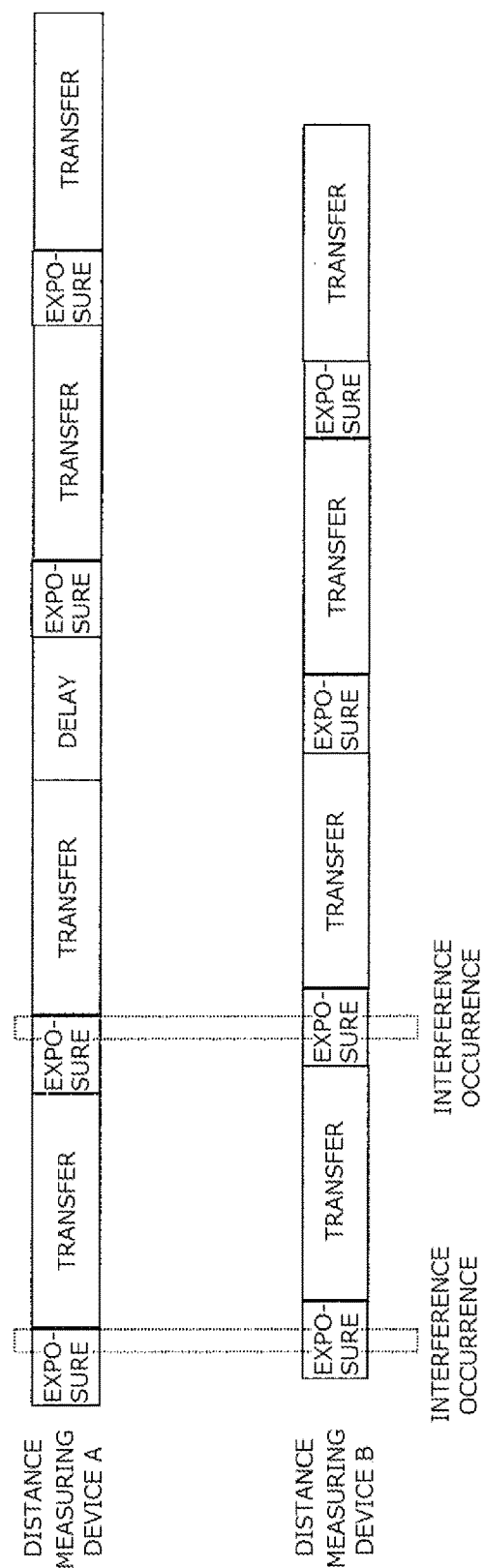
FIG. 12 is a schematic diagram showing timing of exposure and captured image transfer when two distance measuring devices successively interfere.

FIG. 12 is a schematic diagram showing timing of exposure and captured image transfer when two distance measuring devices successively interfere. As shown in FIG. 12, when interference detection signals are successively output, next light emission may be delayed by a period twice as great as the exposure period based on a determination that unavoidable interference is occurring. Thus, a plurality of distance measuring devices that operate at identical timing are allowed to emit light at timing without interference.

Setting the number of times in detecting operations (a predetermined number in step S75 in FIG. 7) to a random number instead of a fixed number can prevent, when there exist a plurality of distance measuring devices that exert the same control, an endless loop event in which the distance measuring devices simultaneously delay the exposure time and again interference occurs at that timing.

As a scheme of further enhancing this interference detection, the timing of light emission and exposure can be modulated (that is, the timing of light emission and exposure is set to irregular intervals instead of regular intervals).

Figure 13:
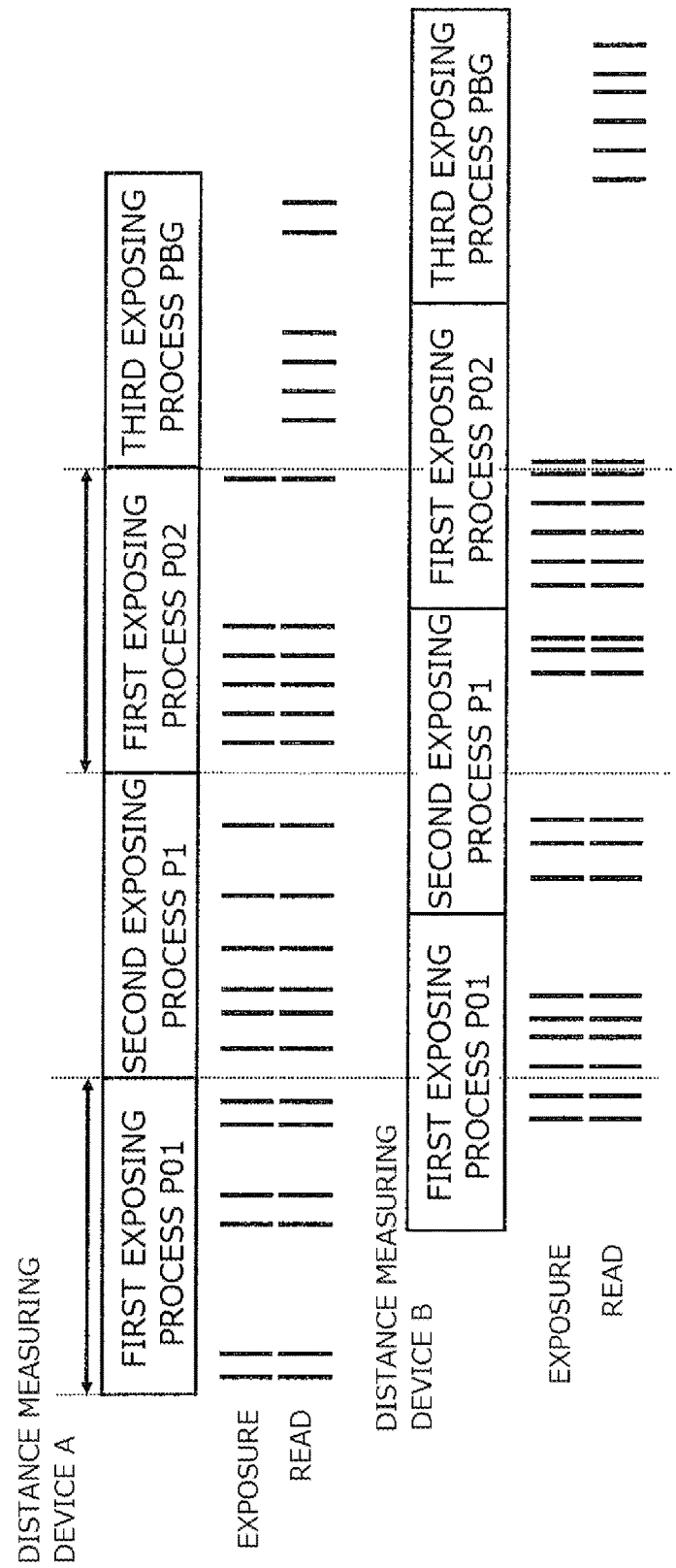
FIG. 13 is a schematic diagram showing timing of light emission and exposure when timing of light emission and exposure is modulated in two distance measuring devices.

FIG. 13 is a schematic diagram showing timing of light emission and exposure when the timing of light emission and exposure are modulated in two distance measuring devices. As shown in the drawing, in an exposing process period of each signal, performing modulation so that light emission pulses and read pulses (that is, exposure pulses) are generated at irregular intervals instead of regular intervals, for example as shown in FIG. 13, the output difference between first exposing process P01 and second-time first exposing process P02 of distance measuring device A attributed to distance measuring device B may possibly be further increased.

Note that, in the present exemplary embodiment, exposure amount S0 is acquired twice within a predetermined period (within a period of one set or one frame) as exposure amounts S01, S02. Instead, exposure amount S1 may be acquired twice as exposure amount S11 and exposure amount S12, or exposure amount BG may be acquired twice as exposure amount BG1 and exposure amount BG2. Thus, the type of signal is not limited.

Further, the distance measuring device according to the present exemplary embodiment has been described using the scheme in which, a distance to a measurement target object is measured based on the ratio between light amounts obtained from two patterns of exposure performed on reflected light from the measurement target object at different timing of the first exposure signal and the second exposure signal relative to a light emission pulse, what is called a pulse TOF scheme. However, the present disclosure is not limited thereto and other TOF scheme may be used (for example, a scheme of measuring a phase difference of reflected light, what is called a phase difference TOF).

Second Exemplary Embodiment

In the following, with reference to the drawings, a description will be given of the configuration and operation of a distance measuring device (a distance measuring and imaging device) according to second exemplary embodiment, focusing on the difference from the first exemplary embodiment.

The second exemplary embodiment is characterized in the exposure method performed by a light receiver (a solid-state image sensor), in which measurement is performed with different light emission and exposure conditions between even lines and odd lines. This can expand the dynamic range.

Figure 14:
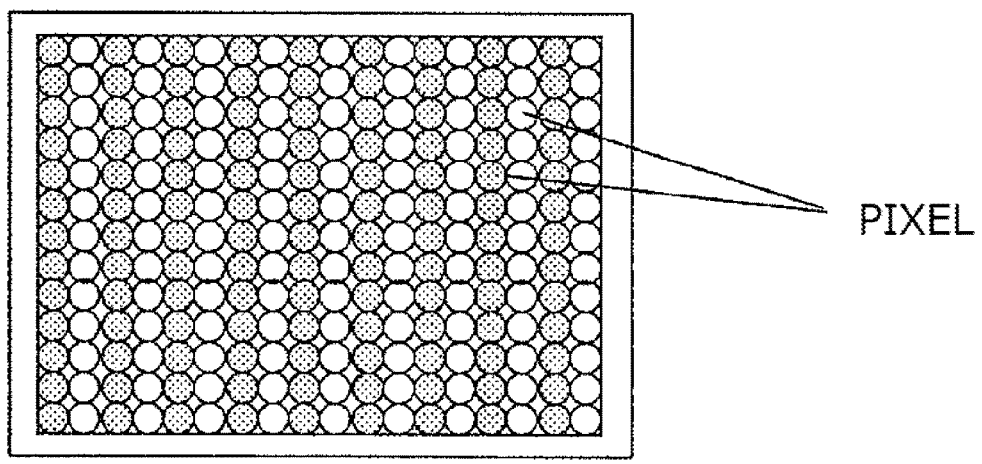
FIG. 14 is a view showing an array of pixels of a solid-state image sensor being a light receiver.

FIG. 14 is a view showing an array of pixels of a solid-state image sensor being a light receiver.

The solid-state image sensor includes a plurality of pixels that receive light. The solid-state image sensor time-divisionally performs capturing for measuring a distance under different conditions between even lines and odd lines. The solid-state image sensor transfers images obtained from the capturing under the two conditions. Interpolating the measurement values of even lines captured under the first condition with a greater number of times of exposure and the measurement values of odd lines captured under the second condition with a fewer number of times of exposure with each other provides exposure amounts S0, S1, BG under the first condition and exposure amounts S0, S1, BG under the second condition with all the pixels.

Figure 15:
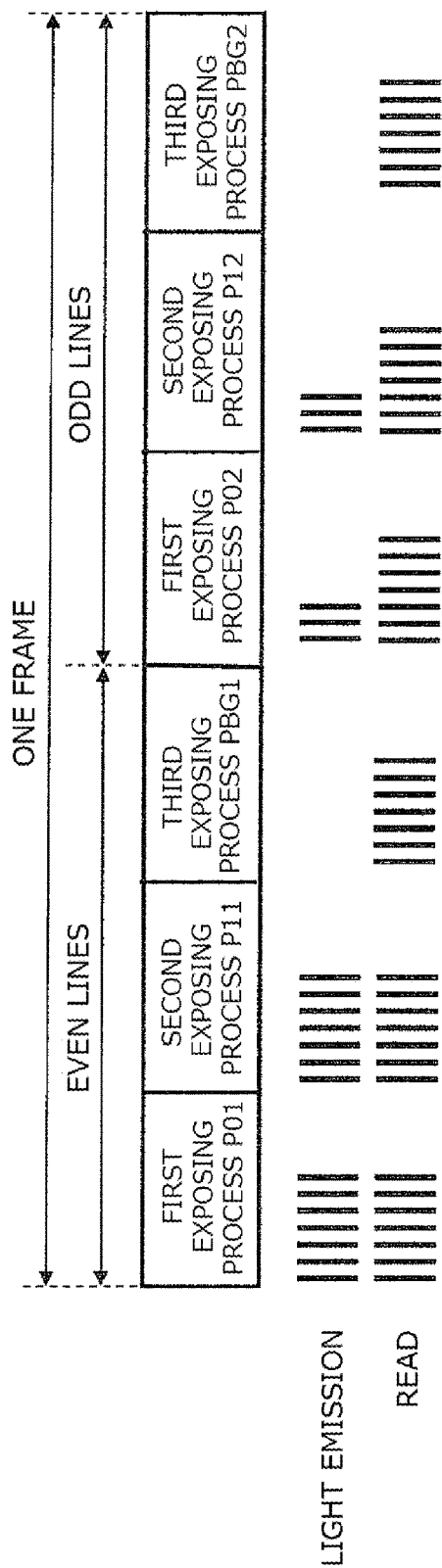
FIG. 15 is a conceptual diagram of light emission and reading under different conditions between even lines and odd lines.

FIG. 15 is a conceptual diagram of light emission and reading under different conditions between even lines and odd lines. The number of times of light emission is increased with even lines in order to increase the light amount, and the number of times of light emission is reduced with odd lines in order to reduce the light amount while keeping the number of times of reading. Here, exposure amount BG1 representing background light obtained from third exposing process PBG1 with even lines and exposure amount BG2 representing background light obtained from third exposing process PBG2 with odd lines are equal to each other in exposure time, and hence are substantially the equivalent outputs when no interference exists. By integrally comparing those two exposure amount BG1 and exposure amount BG2, interference can be detected.

As described above, according to the second exemplary embodiment, performing measurement under different conditions for respective lines expands dynamic range and realizes detection of interference through use of exposure amounts BG1, BG2 representing background light. Further, being different from the first exemplary embodiment, the types of signals can be reduced to three. Accordingly, the number of the memory regions required for storage can be saved to three, and saturation per signal can be increased. Note that, the comparison between exposure amounts BG1, BG2 is not limited to integral comparison, and may be comparison based on a pixel-by-pixel basis (e.g., FIG. 7) or a line-by-line basis.

Note that, signals being compared are not limited to exposure amounts BG1, BG2, and may be exposure amounts S01, S02. With comparison of exposure amounts S11, S12, interference may be detected by calculating outputs per unit time from the exposure time and comparing the outputs.

The distance measuring device of the present disclosure can be used in measuring a distance to a target object, such as a human, a building and the like.

What is claimed is:

1. A distance measuring device using a TOF (Time of Flight) scheme, the distance measuring device comprising:
a light source that emits light in accordance with a light emission signal instructing emission of light to a target object;
a controller that generates the light emission signal, a first exposure signal instructing exposure of reflected light from the target object in synchronization with the light emission signal, a second exposure signal instructing exposure of the reflected light from the target object in synchronization with the light emission signal and at timing different from the first exposure signal, and a third exposure signal instructing exposure of background light in a period during which the reflected light does not exist;
a light receiver that performs a first exposing process according to the first exposure signal, a second exposing process according to the second exposure signal, and a third exposing process according to the third exposure signal; and
a calculator that obtains a distance to the target object based on the TOF scheme by calculating a first exposure amount in the first exposing process, a second exposure amount in the second exposing process, and a third exposure amount in the third exposing process, and using the first exposure amount, the second exposure amount, and the third exposure amount, wherein:

the controller generates, in every predetermined period, the first exposure signal, the second exposure signal, the third exposure signal, and one particular exposure signal selected from the first exposure signal, the second exposure signal, and the third exposure signal, the light receiver performs, in the predetermined period, the first exposing process, the second exposing process, the third exposing process, and a particular exposing process corresponding to the particular exposure signal out of the first exposing process, the second exposing process, and the third exposing process, and the calculator determines, based on a difference between an exposure amount obtained from the particular exposing process and an exposure amount obtained from an exposing process according to one of the first exposure signal, the second exposure signal, and the third exposure signal corresponding to the particular exposure signal, whether or not the light emitted from the distance measuring device and light emitted from other distance measuring device interfere with each other.

2. The distance measuring device according to claim 1, wherein:
the particular exposure signal is the first exposure signal, and
the particular exposing process is the first exposing process.

3. The distance measuring device according to claim 1, wherein:
the particular exposure signal is the second exposure signal, and
the particular exposing process is the second exposing process.

4. The distance measuring device according to claim 1, wherein:
the particular exposure signal is the third exposure signal, and
the particular exposing process is the third exposing process.

5. The distance measuring device according to claim 1, wherein:
the light emission signal has a plurality of pulses, and
generation timing of the plurality of pulses in the particular exposing process is at irregular intervals and different from generation timing of the plurality of pulses in the exposing process according to one of the first exposure signal, the second exposure signal, and the third exposure signal corresponding to the particular exposure signal.

6. The distance measuring device according to claim 1, wherein
when the exposure amount obtained from the exposing process according to one of the first exposure signal, the second exposure signal, and the third exposure signal corresponding to the particular exposure signal is equal to or greater than a first threshold value and equal to or smaller than a second threshold value, the calculator compares the exposure amount obtained from the particular exposing process with the exposure amount obtained from the exposing process according to one of the first exposure signal, the second exposure signal, and the third exposure signal corresponding to the particular exposure signal.

7. The distance measuring device according to claim 1, wherein:

the light receiver is a solid-state image sensor having a plurality of pixels arranged in two-dimensional manner, and the calculator calculates the difference by comparing, on a corresponding pixel-by-pixel basis, the exposure amount obtained from the particular exposing process with the exposure amount obtained from the exposing process according to one of the first exposure signal, the second exposure signal, and the third exposure signal corresponding to the particular exposure signal.

8. The distance measuring device according to claim 7, wherein:
the calculator calculates, for each of the pixels, the difference between the exposure amount obtained from the particular exposing process and the exposure amount obtained from the exposing process according to one of the first exposure signal, the second exposure signal, and the third exposure signal corresponding to the particular exposure signal, the calculator calculates a count value by counting a number of the pixels determined to have the calculated difference greater than a predetermined value, and when the count value is greater than a predetermined number, the calculator sets an interference signal to valid, the interference signal indicating that the light emitted from the distance measuring device and the light emitted from other distance measuring device interfere with each other.

9. The distance measuring device according to claim 8, wherein the calculator sets the interference signal to valid when a successive number of the pixels determined to have the difference greater than the predetermined value is greater than the predetermined number.

10. The distance measuring device according to claim 8, wherein the calculator determines the predetermined number by a random number.

11. A solid-state image sensor used in a distance measuring device of a TOF (Time of Flight) scheme, wherein the distance measuring device includes:
a light source that emits light in accordance with a light emission signal instructing emission of light to a target object;

a controller that generates the light emission signal, a first exposure signal instructing exposure of reflected light from the target object in synchronization with the light emission signal, a second exposure signal instructing exposure of the reflected light from the target object in synchronization with the light emission signal and at timing different from the first exposure signal, and a third exposure signal instructing exposure of background light in a period during which the reflected light does not exist;

a light receiver that performs a first exposing process according to the first exposure signal, a second exposing process according to the second exposure signal, and a third exposing process according to the third exposure signal; and a calculator that obtains a distance to the target object based on the TOF scheme by calculating a first exposure amount in the first exposing process, a second exposure amount in the second exposing process, and a third exposure amount in the third exposing process, and using the first exposure amount, the second exposure amount, and the third exposure amount, wherein the controller generates, in every predetermined period, the first exposure signal, the second exposure signal, the third exposure signal, and one particular exposure signal selected from the first exposure signal, the second exposure signal, and the third exposure signal, the light receiver performs, in the predetermined period, the first exposing process, the second exposing process, the third exposing process, and a particular exposing process corresponding to the particular exposure signal out of the first exposing process, the second exposing process, and the third exposing process, the calculator determines, based on a difference between an exposure amount obtained from the particular exposing process and an exposure amount obtained from an exposing process according to one of the first exposure signal, the second exposure signal, and the third exposure signal corresponding to the particular exposure signal, whether or not the light emitted from the distance measuring device and light emitted from other distance measuring device interfere with each other, and the light receiver includes the solid-state image sensor.

* * * * *